United States Patent
Laitinen

(10) Patent No.: US 8,064,225 B2
(45) Date of Patent: Nov. 22, 2011

(54) REACTOR ARRANGEMENT

(75) Inventor: Matti Laitinen, Kirkkonummi (FI)

(73) Assignee: ABB Oy, Helsinki (FI)

( * ) Notice: Subject to any disclaimer, the term of this patent is extended or adjusted under 35 U.S.C. 154(b) by 301 days.

(21) Appl. No.: 12/403,610

(22) Filed: Mar. 13, 2009

(65) Prior Publication Data
US 2009/0231074 A1    Sep. 17, 2009

(30) Foreign Application Priority Data

Mar. 14, 2008  (EP) .................................... 08152726

(51) Int. Cl.
*H01F 38/04* (2006.01)
*H02M 1/12* (2006.01)
*G05F 5/06* (2006.01)

(52) U.S. Cl. .............................. 363/12; 363/44; 323/206

(58) Field of Classification Search .................. 336/110, 336/165; 363/12, 39, 44; 323/205–206
See application file for complete search history.

(56) References Cited

U.S. PATENT DOCUMENTS

| | | | | |
|---|---|---|---|---|
| 2,790,136 A | * | 4/1957 | Bennett et al. ................. | 363/126 |
| 3,353,084 A | * | 11/1967 | Kurimura ........................ | 363/77 |
| 3,444,450 A | * | 5/1969 | Floris .............................. | 318/82 |
| 3,465,233 A | * | 9/1969 | Johnston et al. ............... | 363/135 |
| 5,821,844 A | * | 10/1998 | Tominaga et al. ............. | 336/110 |
| 7,132,812 B1 | | 11/2006 | Wu et al. | |

FOREIGN PATENT DOCUMENTS

| | | | |
|---|---|---|---|
| EP | 0 579 962 | | 1/1994 |
| JP | 2006319176 A | * | 11/2006 |
| WO | WO 03088468 A1 | * | 10/2003 |

OTHER PUBLICATIONS

European Search Report dated Jul. 24, 2008, from corresponding European application.

* cited by examiner

*Primary Examiner* — Adolf Berhane
*Assistant Examiner* — Jeffrey Gblende
(74) *Attorney, Agent, or Firm* — Young & Thompson

(57) ABSTRACT

A reactor arrangement for alternating electrical currents includes, for each alternating electrical current, different coils (105, 107, 105a, 107a) for positive and negative half-cycles of that alternating electrical current. The negative and positive half-cycles of the alternating electrical current are directed to the different coils with the aid of unidirectional electrical components (106, 108, 106a, 108a) such as, for example, diodes. All coils are arranged to magnetize a common magnetic core element (104) in a same direction. Therefore, from the viewpoint of the magnetization of the magnetic core element, the flowing directions of the alternating electrical currents are not significant. Hence, the common-mode inductance of the reactor arrangement has substantially a same value as the differential-mode inductance.

11 Claims, 8 Drawing Sheets

REACTOR ARRANGEMENT

FIELD OF THE INVENTION

The invention relates to a reactor arrangement for alternating electrical currents and to a method for providing common-mode inductance for alternating electrical currents. Furthermore, the invention relates to an electrical converter device having a reactor arrangement.

BACKGROUND

In conjunction with many electrical converter devices, e.g. a frequency converter, an inductive reactor arrangement is needed between an inverter bridge and an electrical system, e.g. an electrical motor, connected to the inverter bridge, and/or between a rectifier bridge and an alternating voltage network. The reactor arrangement can be needed, for example, for reducing slew rate of output voltages of an inverter, for over-current protection, for reducing radio frequency (RF) emissions, for reducing common-mode electrical currents, for suppressing disturbance electrical currents, and/or for suppressing harmonics of voltages and/or of electrical currents.

From the viewpoint of suppressing e.g. conductive RF-interferences and stray electrical currents it is, in many applications, important that a reactor arrangement provides sufficient common-mode inductance. The stray electrical currents may cause e.g. harmful electrical currents via bearings of rotating electrical machines supplied with a frequency converter. A conventional three-phase reactor arrangement according to the prior art comprises a three-leg magnetic core element made of magnetically amplifying material, i.e. material having the relative permeability greater than unity ($\mu_r > 1$). Windings for different phases are located around respective legs of the three-leg magnetic core element. The common-mode inductance of a reactor arrangement of the kind described above is relatively low, i.e. the ratio between the common-mode inductance and the differential mode inductance is low, because the magnetic core element does not provide a closed magnetic flux path for a common-mode magnetic flux component. Therefore, the common-mode magnetic flux component has to flow via air and/or other structures of the reactor arrangement. It is possible to provide the magnetic core element with one or more additional leg in order to provide a closed magnetic flux path for the common-mode magnetic flux component via the magnetic core element. Another conventional three-phase reactor arrangement according to the prior art comprises a five-leg magnetic core element. This kind of solution, however, increases the size and thus the weight of the magnetic core element.

SUMMARY

In accordance with a first aspect of the invention, there is provided a new reactor arrangement suitable for providing common-mode inductance. The reactor arrangement comprises:

a first alternating voltage terminal for receiving first alternating electrical current,
a second alternating voltage terminal for receiving second alternating electrical current,
a first direct voltage terminal,
a second direct voltage terminal,
a magnetic core element made of magnetically amplifying material,
a first unidirectional electrical component and a first coil on a first electrical current path from the first alternating voltage terminal to the first direct voltage terminal,
a second unidirectional electrical component and a second coil on a second electrical current path from the second direct voltage terminal to the first alternating voltage terminal,
a third unidirectional electrical component and a third coil on a third electrical current path from the second alternating voltage terminal to the first direct voltage terminal, and
a fourth unidirectional electrical component and a fourth coil on a fourth electrical current path from the second direct voltage terminal to the second alternating voltage terminal wherein:
the first unidirectional electrical component and the second unidirectional electrical component are arranged to direct the first alternating electrical current to the first coil as a response to a situation in which the first alternating electrical current is positive, and to the second coil, a response to a situation in which the first alternating electrical current is negative,
the third unidirectional electrical component and the fourth unidirectional electrical component are arranged to direct the second alternating electrical current to the third coil as a response to a situation in which the first alternating electrical current is positive, and to the fourth coil, a response to a situation in which the first alternating electrical current is negative, and
the first coil, the second coil, the third coil, and the fourth coil are arranged to magnetize the magnetic core element in a same direction and to have mutual magnetic couplings.

The magnetic core element of the reactor arrangement is magnetized in the same direction during both negative and positive temporal portions of both the first alternating electrical current and the second alternating electrical current. Therefore, from the viewpoint of the magnetization of the magnetic core element, the flowing directions of the first alternating electrical current and the second alternating electrical current are not significant. For example, if effects of stray magnetic fluxes are neglected, the magnetic core element is magnetized in a substantially similar manner in a situation in which the first and the second alternating electrical currents have a same amplitude and a same phase, i.e. there is no differential-mode electrical current, and in a situation in which the first and the second alternating electrical currents have a same amplitude but opposite phases, i.e. there is no common-mode electrical current. Hence, the common-mode inductance of the reactor arrangement has substantially a same value as the differential-mode inductance and, in order to obtain a certain value of the common-mode inductance, the size and thus the weight of the reactor arrangement can be smaller than those of conventional reactor arrangements of the kind described earlier in this document.

Furthermore, in conjunction with certain embodiments of the invention the size and thus the weight of a magnetic core element can be made smaller than those of magnetic core elements of certain conventional reactor arrangements also when considering the differential-mode inductance. For example, the weight of a rectangular magnetic core element (U-I core) of a three-phase reactor arrangement according to an embodiment of the invention can be made about 40 percent lighter than that of a three-leg magnetic core element of a conventional three-phase reactor arrangement providing same differential-mode inductance if the reactor arrangement according to the embodiment of the invention has about two times more turns in its windings than the said conventional reactor arrangement, and if the magnetic core elements have substantially equal cross-sectional areas, and if same maximum magnetic flux density (T) is being used in both of the magnetic core elements.

In accordance with a second aspect of the invention, there is provided a new electrical converter device that comprises a reactor arrangement according to the invention. The electrical converter device can be, e.g. an inverter, a rectifier, and/or a frequency converter.

In accordance with a third aspect of the invention, there is provided a new method for providing common-mode inductance for alternating electrical currents. The method comprises:

directing a first alternating electrical current to a first coil if the first alternating electrical current is positive in order to magnetize a magnetic core element made of magnetically amplifying material in a pre-determined direction, directing the first alternating electrical current to a second coil if the first alternating electrical current is negative in order to magnetize the magnetic core element in the pre-determined direction, directing a second alternating electrical current to a third coil if the second alternating electrical current is positive in order to magnetize the magnetic core element in the pre-determined direction, and directing the second alternating electrical current to a fourth coil if the second alternating electrical current is negative in order to magnetize the magnetic core element in the pre-determined direction, wherein the first coil, the second coil, the third coil, and the fourth coil have mutual magnetic couplings.

A number of exemplifying embodiments of the invention are described in accompanied dependent claims.

Various embodiments of the invention both as to constructions and to methods of operation, together with additional objects and advantages thereof, will be best understood from the following description of specific exemplifying embodiments when read in connection with the accompanying drawings.

The exemplifying embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1A:
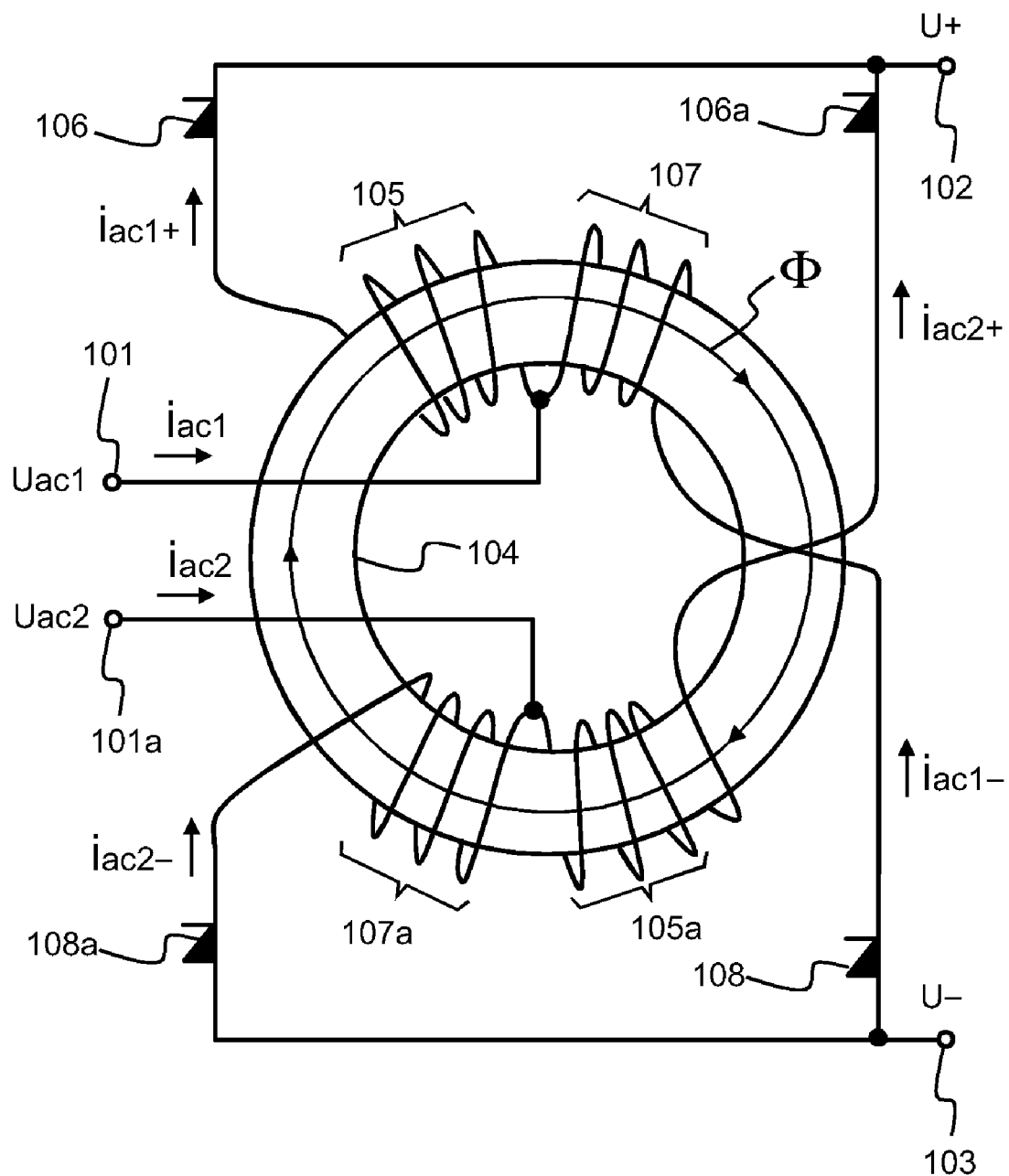
FIGS. 1a and 1b show circuit diagrams of reactor arrangements according to embodiments of the invention.

FIG. 1a shows a circuit diagram of a reactor arrangement according to an embodiment of the invention. The reactor arrangement comprises first and second alternating voltage terminals 101 and 101a for receiving first and second alternating electrical currents $i_{ac1}$ and $i_{ac2}$ from an external alternating voltage system ($U_{ac1}$, $U_{ac2}$). Without limiting generality, the alternating electrical current $i_{ac1}$ can be defined to be positive when it flows in a direction of the arrow shown in conjunction with the alternating voltage terminal 101. Correspondingly, the alternating electrical current $i_{ac2}$ can be defined to be positive when it flows in a direction of the arrow shown in conjunction with the alternating voltage terminal 101a. The reactor arrangement comprises a first direct voltage terminal 102 and a second direct voltage terminal 103 for connecting to an external direct voltage system (U+, U−). The reactor arrangement comprises a first unidirectional electrical component 106 and a first coil 105 on a first electrical current path from the first alternating voltage terminal 101 to the first direct voltage terminal 102. The reactor arrangement comprises a second unidirectional electrical component 108 and a second coil 107 on a second electrical current path from the second direct voltage terminal 103 to the first alternating voltage terminal 101. The reactor arrangement comprises a third unidirectional electrical component 106a and a third coil 105a on a third electrical current path from the second alternating voltage terminal 101a to the first direct voltage terminal 102. The reactor arrangement comprises a fourth unidirectional electrical component 108a and a fourth coil 107a on a fourth electrical current path from the second direct voltage terminal 103 to the second alternating voltage terminal 101a.

The unidirectional electrical components 106 and 108 are arranged to direct the alternating electrical current $i_{ac1}$ to the coil 105 as a response to a situation in which the alternating electrical current $i_{ac1}$ is positive, and to the coil 107, a response to a situation in which the alternating electrical current $i_{ac1}$ is negative. Correspondingly, the unidirectional electrical components 106a and 108a are arranged to direct the alternating electrical current $i_{ac2}$ to the coil 105a as a response to a situation in which the alternating electrical current $i_{ac2}$ is positive, and to the coil 107a, a response to a situation in which the alternating electrical current $i_{ac2}$ is negative. The unidirectional electrical component 106 (106a) can be any electrical component that can be used for allowing electrical current to flow in a direction shown by the arrow $i_{ac1}+$ ($i_{ac2}+$) and for suppressing electrical current in a direction opposite to the arrow $i_{ac1}+$ ($i_{ac2}+$). Correspondingly, the unidirectional electrical component 108 (108a) can be any electrical component that can be used for allowing electrical current to flow in a direction shown by the arrow $i_{ac1}-$ ($i_{ac2}-$) and for suppressing electrical current in a direction opposite to the arrow $i_{ac1}-$ ($i_{ac2}-$). Each of the unidirectional electrical components 106, 108, 106a, and 108a can be, for example: a diode, a thyristor, a gate turn-off thyristor (GTO), a field effect transistor (FET), a bipolar transistor, an insulated gate bipolar transistor (IGBT), or a combination of two or more of the above-mentioned electrical components, respectively. In the attached figures, a half of a symbol of a diode is used as a symbol for a general unidirectional electrical component.

The reactor arrangement comprises a magnetic core element 104 made of magnetically amplifying material, i.e.

material having the relative permeability greater than unity ($\mu_r > 1$). The magnetic core element can be made of ferromagnetic or paramagnetic material. The magnetic core element is preferably made of soft magnetic material that provides low hysteresis losses, e.g. electrical steel sheets, soft magnetic powder, ferrites, etc. The coils 105, 107, 105a, and 107a are arranged to magnetize the magnetic core element 104 in a same direction and the said coils are arranged to have mutual magnetic couplings. In other words, the coil 105 is arranged to magnetize the magnetic core element 104 as a response to a situation in which the alternating electrical current $i_{ac1}$ is directed to the coil 105, the coil 107 is arranged to magnetize the magnetic core element 104 in a same direction as the coil 105 as a response to a situation in which the alternating electrical current $i_{ac1}$ is directed to the coil 107, the coil 105a is arranged to magnetize the magnetic core element 104 in the same direction as the coil 105 as a response to a situation in which the alternating electrical current $i_{ac2}$ is directed to the coil 105a, and the coil 107a is arranged to magnetize the magnetic core element 104 in the same direction as the coil 105 as a response to a situation in which the alternating electrical current $i_{ac2}$ is directed to the coil 107a. In this exemplifying embodiment of the invention, each of the coils 105, 107, 105a, and 107a is capable of generating into the magnetic core element a main magnetic flux that penetrates all the said coils. The main magnetic flux is denoted with Φ in FIG. 1a.

The magnetic core element 104 is magnetized in the same direction during both negative and positive temporal portions of both the alternating electrical currents $i_{ac1}$ and $i_{ac2}$. Therefore, from the viewpoint of the magnetization of the magnetic core element, the flowing directions of the alternating electrical currents $i_{ac1}$ and $i_{ac2}$ are not significant. For example, if effects of stray magnetic fluxes are neglected, the magnetic core element is magnetized in a substantially similar manner in a situation in which the alternating electrical currents $i_{ac1}$ and $i_{ac2}$ have a same amplitude and a same phase, i.e. there is no differential-mode electrical current ($[i_{ac1} - i_{ac2}]/2 = 0$), and in a situation in which the alternating electrical currents $i_{ac1}$ and $i_{ac2}$ have a same amplitude but opposite phases, i.e. there is no common-mode electrical current ($[i_{ac1} + i_{ac2}]/2 = 0$). Hence, the common-mode inductance of the reactor arrangement is substantially same as the differential-mode inductance.

Figure 1B:
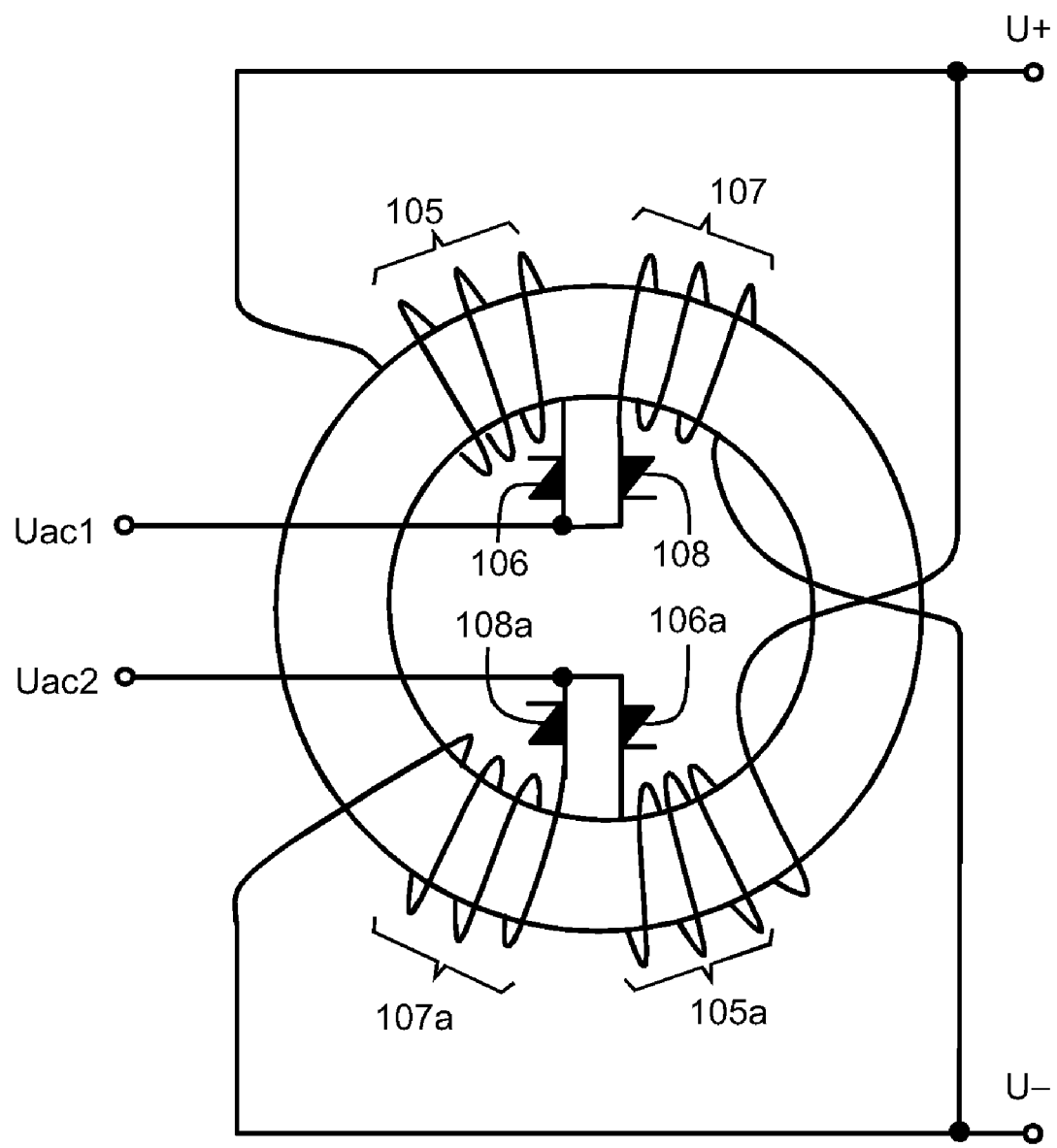

FIG. 1b shows a circuit diagram of a reactor arrangement according to an embodiment of the invention in which the unidirectional electrical components 106, 108, 106a, 108a are in different positions with respect to the coils 105, 107, 105a, 107a than in the reactor arrangement shown in FIG. 1a.

Figure 2:
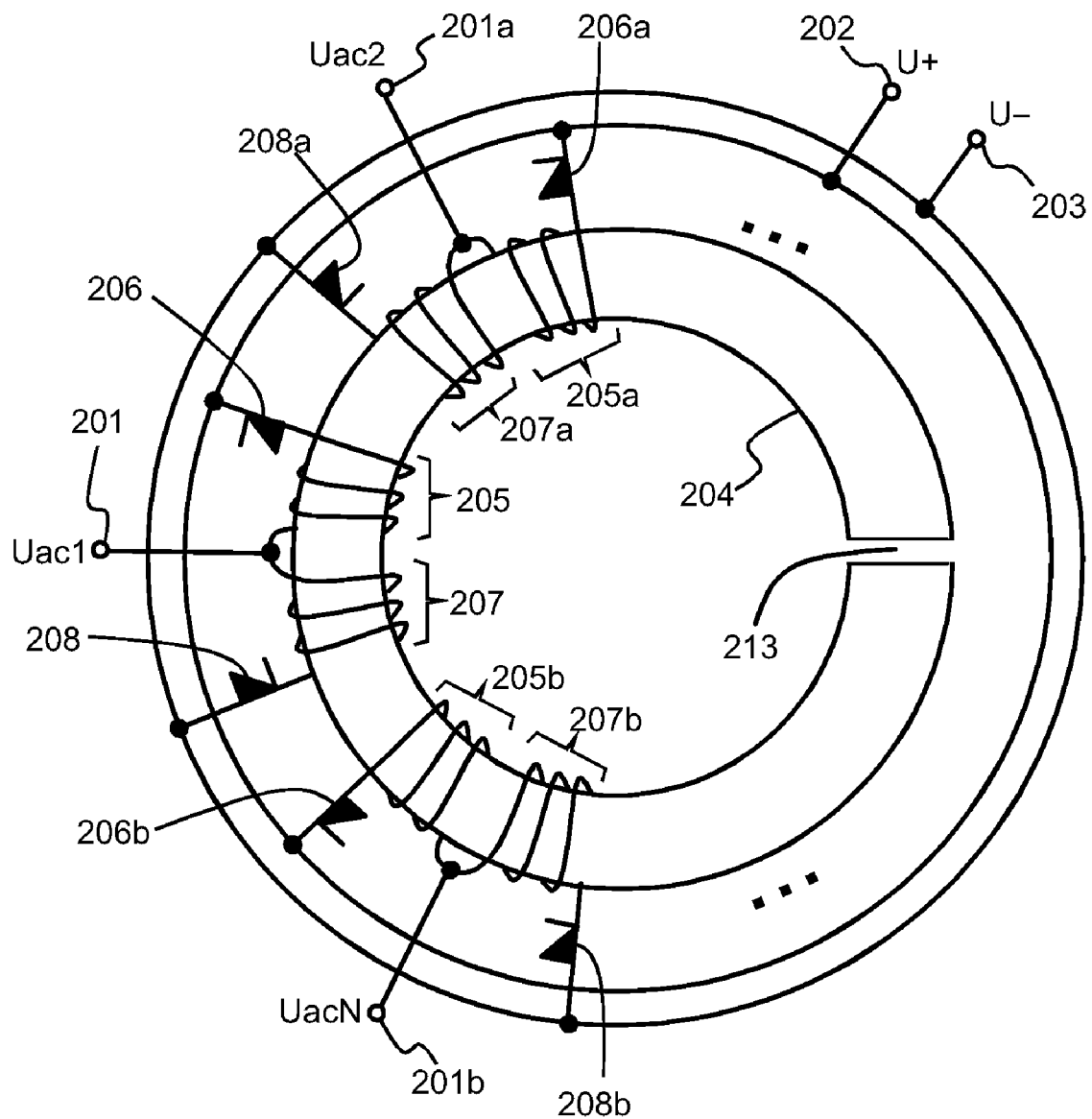
FIG. 2 shows a circuit diagram of a multiphase reactor arrangement according to an embodiment of the invention.

FIG. 2 shows a circuit diagram of a multiphase reactor arrangement according to an embodiment of the invention. The reactor arrangement comprises N alternating voltage ($U_{ac1}, U_{ac2}, \ldots, U_{acN}$) terminals 201, 201a, \ldots, 201b. The alternating voltage terminal 201 is coupled to a first direct voltage terminal 202 and to a second direct voltage terminal 203 via two unidirectional electrical components 206 and 208, and via two coils 205 and 207 in the same way as in the reactor arrangement shown in FIG. 1a, wherein the alternating voltage terminal 101 is connected to the first direct voltage terminal 102 and to the second direct voltage terminal 103 via the unidirectional electrical components 106 and 108 and the coils 105 and 107. The alternating voltage terminal 201a is coupled to a first direct voltage terminal 202 and to a second direct voltage terminal 203 via two unidirectional electrical components 206a and 208a, and via two coils 205a and 207a in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The alternating voltage terminal 201b is coupled to a first direct voltage terminal 202 and to a second direct voltage terminal 203 via two unidirectional electrical components 206b and 208b, and via two coils 205b and 207b in the same way as, in FIG. 1a, the alternating voltage terminal 101 is connected to the first direct voltage terminal 102 and to the second direct voltage terminal 103 via the unidirectional electrical components 106 and 108 and the coils 105 and 107. The coils 205, 207, 205a, 207a, \ldots, 205b, and 207b are arranged to magnetize a common magnetic core element 204 in a same direction and the said coils are arranged to have mutual magnetic couplings.

In FIG. 2, the shape of the magnetic core element 204 is a toroid. The shape of the magnetic core element can be as well, for example, a rectangle or a polygon that has as many angles as there are alternating voltage phases (e.g. a triangle for three phase alternating voltage). Each leg of a polygon is preferably dedicated for coils related to one alternating voltage phase, e.g. coils 205 and 207 can be wound around a first leg of the polygon, coils 205a and 207a can be wound around a second leg of the polygon, etc.

In a reactor arrangement according to an embodiment of the invention, the magnetic core element 204 is arranged to form a magnetic gap 213. The magnetic gap may contain for example air, plastic, or some other material that has a smaller relative permeability ($\mu_r$) than that of the material of the magnetic core element 204. The purpose of the magnetic gap 213 can be linearization of operation of the reactor arrangement. It is also possible to use more than one magnetic gap.

Figure 3:
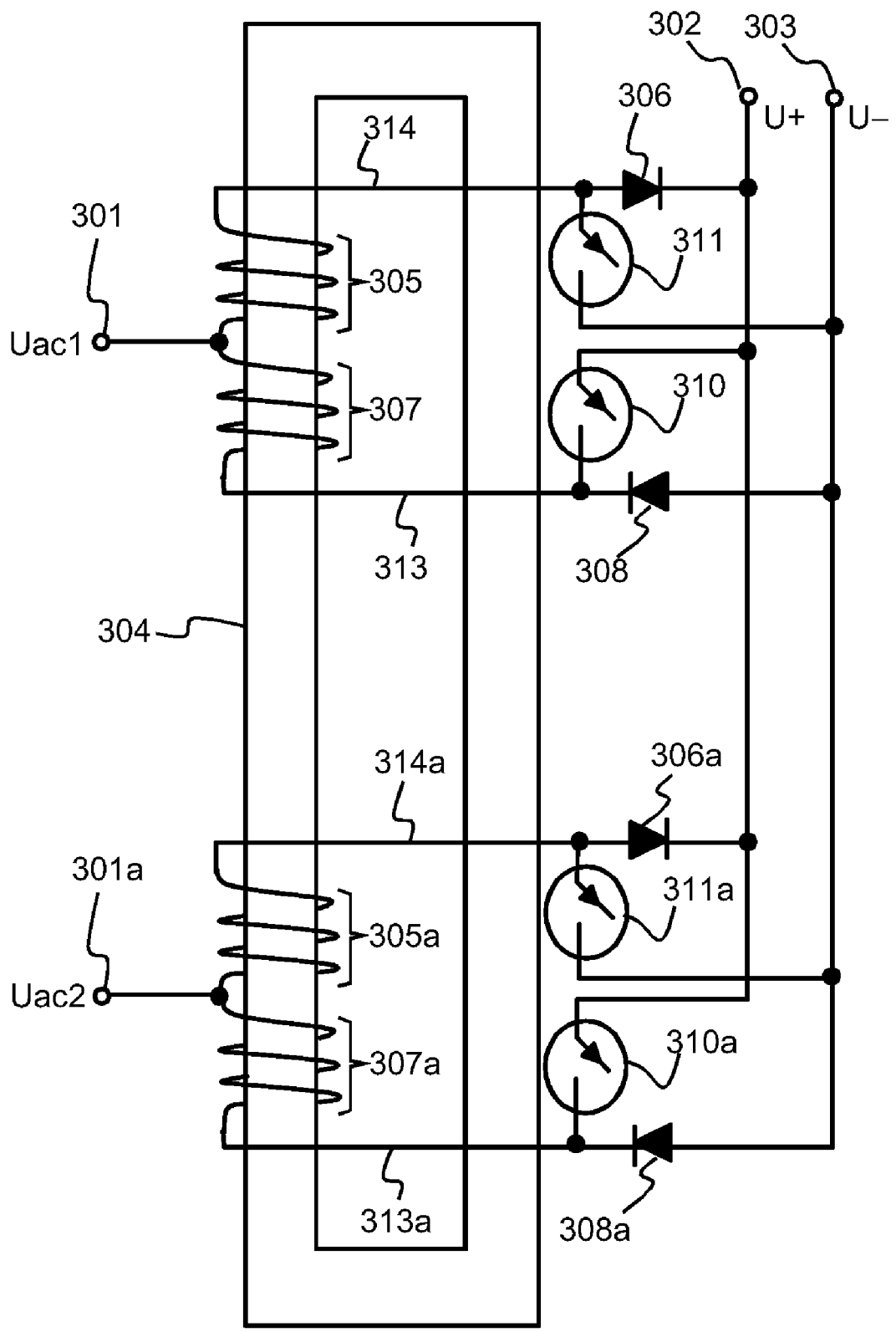
FIG. 3 shows a circuit diagram of a reactor arrangement according to an embodiment of the invention.

FIG. 3 shows a circuit diagram of a reactor arrangement according to an embodiment of the invention. The reactor arrangement comprises a first alternating voltage terminal 301 and a second alternating voltage terminal 301a for receiving first alternating electrical current and second alternating current from an external alternating voltage ($U_{ac1}$ and $U_{ac2}$) system, respectively. The reactor arrangement comprises a first direct voltage terminal 302 and a second direct voltage terminal 303 for connecting to an external direct voltage (U+, U−) system. The reactor arrangement comprises a first coil 305 and a first unidirectional electrical component 306 on a first electrical current path from the alternating voltage terminal 301 to the first direct voltage terminal 302. The reactor arrangement comprises a second unidirectional electrical component 308 and a second coil 307 on a second electrical current path from the second direct voltage terminal 303 to the alternating voltage terminal 301. The reactor arrangement comprises a third unidirectional electrical component 306a and a third coil 305a on a third electrical current path from the second alternating voltage terminal 301a to the first direct voltage terminal 302. The reactor arrangement comprises a fourth unidirectional electrical component 308a and a fourth coil 307a on a fourth electrical current path from the second direct voltage terminal 303 to the second alternating voltage terminal 301a.

The unidirectional electrical components 306 and 308 are arranged to direct the first alternating electrical current to the coil 305 as a response to a situation in which the first alternating electrical current is positive, and to the coil 307, a response to a situation in which the first alternating electrical current is negative. The unidirectional electrical components 306a and 308a are arranged to direct the second alternating electrical current to the coil 305a as a response to a situation in which the second alternating electrical current is positive, and to the coil 307a, a response to a situation in which the second alternating electrical current is negative. The coils 305, 307, 305a, and 307a are arranged to magnetize a magnetic core element 304 in a same direction and the said coils are arranged to have mutual magnetic couplings.

The unidirectional electrical component 306 is located between the coil 305 and the first direct voltage terminal 302 on the electrical current path from the first alternating voltage terminal 301 to the first direct voltage terminal 302. The unidirectional electrical component 308 is located between the second direct voltage terminal 303 and the coil 307 on the electrical current path from the second direct voltage terminal 303 to the first alternating voltage terminal 301. The unidirectional electrical component 306a is located between the coil 305a and the first direct voltage terminal 302 on the electrical current path from the second alternating voltage terminal 301a to the first direct voltage terminal 302. The unidirectional electrical component 308a is located between the second direct voltage terminal 303 and the coil 307a on the electrical current path from the second direct voltage terminal 303 to the second alternating voltage terminal 301a.

The reactor arrangement comprises a first controllable electrical switch 310 arranged to form an unidirectional electrical current path from the first direct voltage terminal 302 to an electrical node 313 that is between the unidirectional electrical component 308 and the coil 307. The reactor arrangement comprises a second controllable electrical switch 311 arranged to form an unidirectional electrical current path from an electrical node 314 that is between the coil 305 and the unidirectional electrical component 306 to the second direct voltage terminal 303. The reactor arrangement comprises a third controllable electrical switch 310a arranged to form an unidirectional electrical current path from the first direct voltage terminal 302 to an electrical node 313a that is between the unidirectional electrical component 308a and the coil 307a. The reactor arrangement comprises a fourth controllable electrical switch 311a arranged to form an unidirectional electrical current path from an electrical node 314a that is between the coil 305a and the unidirectional electrical component 306a to the second direct voltage terminal 303. With the aid of the controllable electrical switches 310, 311, 301a, and 311a it is possible to transfer energy, not only in a direction from the alternating voltage terminals 301 and 301a to the direct voltage terminals 302 and 303, but also in the opposite direction from the direct voltage terminals to the alternating voltage terminals.

In this exemplifying embodiment of the invention, the unidirectional electrical components 306, 308, 306a, and 308a are diodes. Each of the controllable electrical switches 310, 311, 301a, and 311a can be, for example: a thyristor, a gate turn-off thyristor (GTO), a field effect transistor (FET), a bipolar transistor, and an insulated gate bipolar transistor (IGBT), or a combination of two or more above-mentioned electrical components, respectively. In FIG. 3, a combination of a symbol of a switch and an arrowhead is used as a symbol for a general controllable electrical switch that is capable of forming a controllable unidirectional electrical current path.

Figure 4:
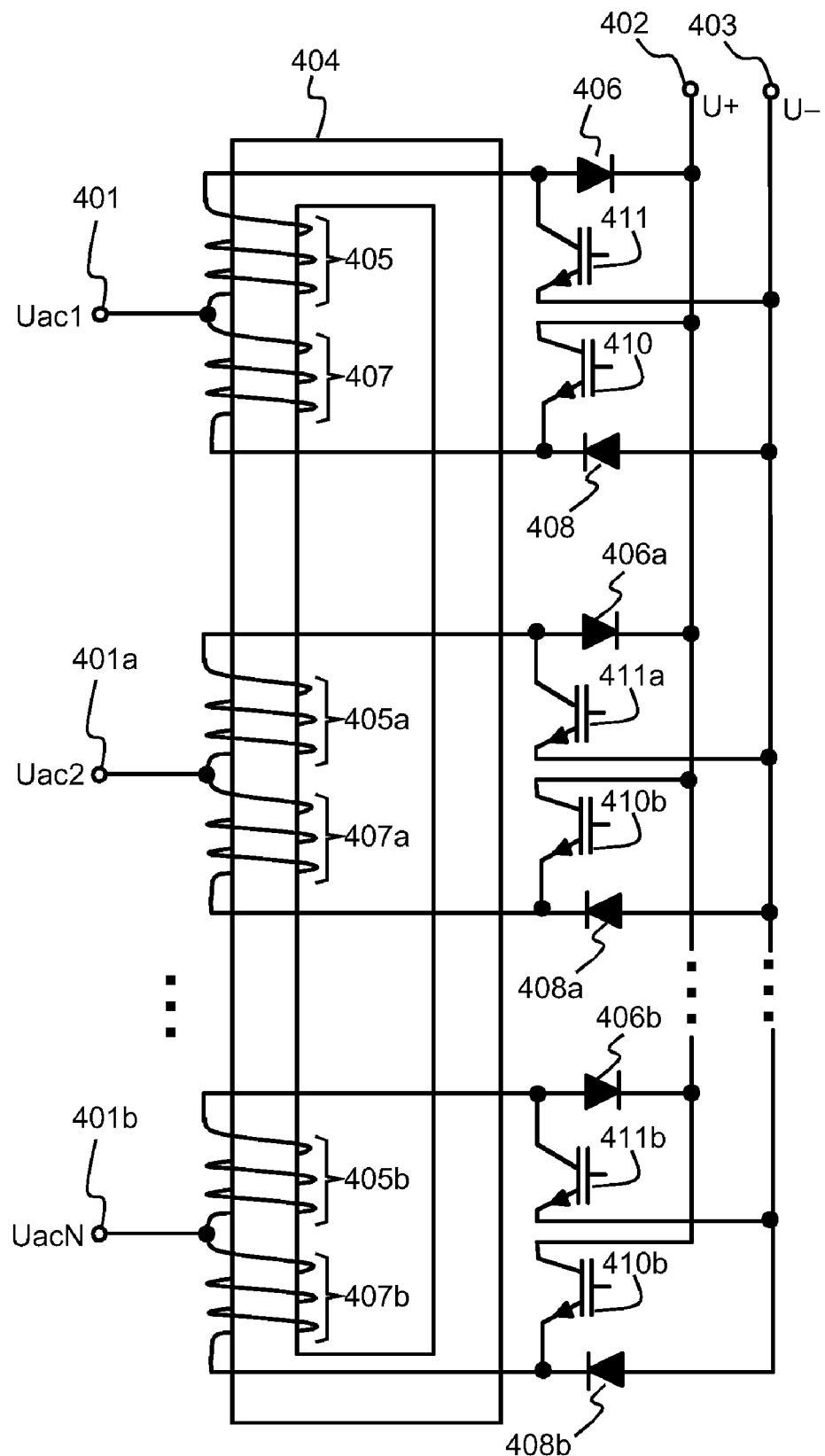
FIG. 4 shows a circuit diagram of a multiphase reactor arrangement according to an embodiment of the invention.

FIG. 4 shows a circuit diagram of a multiphase reactor arrangement according to an embodiment of the invention. The reactor arrangement comprises N alternating voltage ($U_{ac1}$, $U_{ac2}$, ..., $U_{acN}$) terminals 401, 401a, ..., 401b. The alternating voltage terminal 401 is coupled to a first direct voltage terminal 402 and to a second direct voltage terminal 403 via two unidirectional electrical components 406 and 408, via two controllable electrical switches 410 and 411, and via two coils 405 and 407 in the same way as in the reactor arrangement shown in FIG. 3, wherein the alternating voltage terminal 301 is connected to the first direct voltage terminal 302 and to the second direct voltage terminal 303 via the unidirectional electrical components 306 and 308, controllable electrical switches 310 and 311, and the coils 305 and 307. The alternating voltage terminal 401a is coupled to a first direct voltage terminal 402 and to a second direct voltage terminal 403 via two unidirectional electrical components 406a and 408a, via two controllable electrical switches 410a and 411a, and via two coils 405a and 407a in the same way as, in FIG. 3, the alternating voltage terminal 301 is connected to the first direct voltage terminal 302 and to the second direct voltage terminal 303 via the unidirectional electrical components 306 and 308, controllable electrical switches 310 and 311, and the coils 305 and 307. The alternating voltage terminal 401b is coupled to a first direct voltage terminal 402 and to a second direct voltage terminal 403 via two unidirectional electrical components 406b and 408b, via two controllable electrical switches 410b and 411b, and via two coils 405b and 407b in the same way as, in FIG. 3, the alternating voltage terminal 301 is connected to the first direct voltage terminal 302 and to the second direct voltage terminal 303 via the unidirectional electrical components 306 and 308, controllable electrical switches 310 and 311, and the coils 305 and 307. In this exemplifying embodiment of the invention, the unidirectional electrical components 406, 408, 406a, 408a, ..., 406b, 408b are diodes and the controllable electrical switches 410, 411, 410a, 411a, ..., 410b, and 411b are insulated gate bipolar transistor (IGBT). The coils 405, 407, 405a, 407a, ..., 405b, and 407b are arranged to magnetize a common magnetic core element 404 in a same direction and the said coils are arranged to have mutual magnetic couplings.

Figure 5:
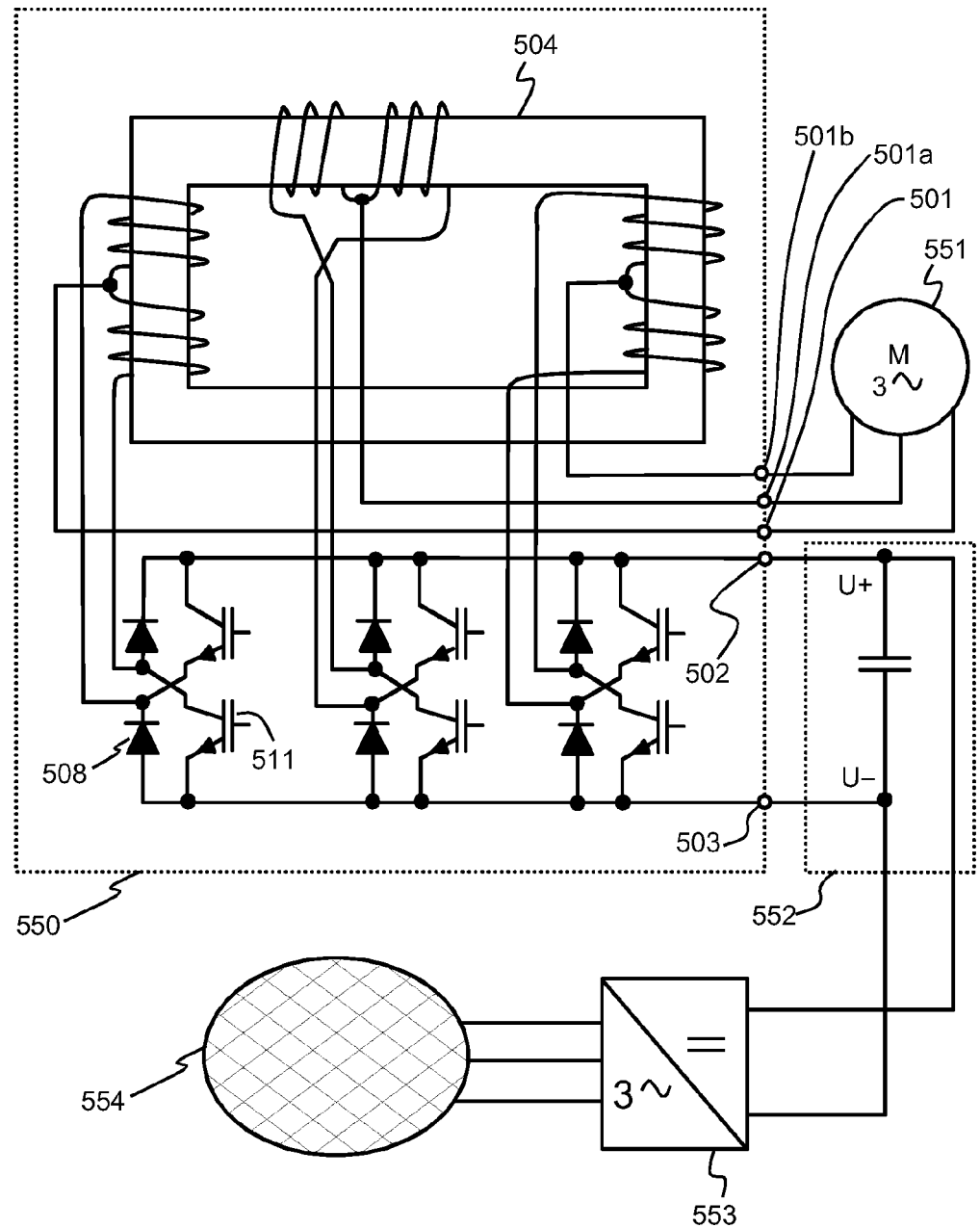
FIG. 5 shows a circuit diagram of an electrical converter device according to an embodiment of the invention.

FIG. 5 shows a circuit diagram of an electrical converter device according to an embodiment of the invention. The electrical converter device comprises a reactor arrangement 550. Alternating voltage terminals 501, 501a, and 501b of the reactor arrangement constitute terminals for connecting the electrical converter device to a load 551. In the exemplifying situation shown in FIG. 5 the load is a three phase alternating current motor. The load can be as well some other electrical device, e.g. an induction heater. An intermediate circuit 552 of the electrical converter device is coupled between a first direct voltage terminal 502 and a second direct voltage terminal 503 of the reactor arrangement. The reactor arrangement 550 has a rectangular magnetic core element 504. The magnetic core element 504 could as well be, for example, a toroid or a triangle. The reactor arrangement 550 constitutes a main circuit of a converter unit that is able to transfer energy from the intermediate circuit 552 to the load 551 and, preferably but not necessarily, also to transfer energy from the load to the intermediate circuit. Control systems of the said converter unit are not shown in FIG. 5. The electrical converter device further comprises a converter unit 553. The converter unit 553 can be e.g. a rectifier that is arranged to transfer energy from an alternating voltage network 554 to the intermediate circuit 552. The converter unit can be as well a device that is capable of transferring energy, not only from the alternating voltage network 554 to the intermediate circuit 552, but also from the intermediate circuit back to the alternating voltage network. Also the converter unit 553 may comprise a reactor arrangement according to an embodiment of the invention.

Figure 6:
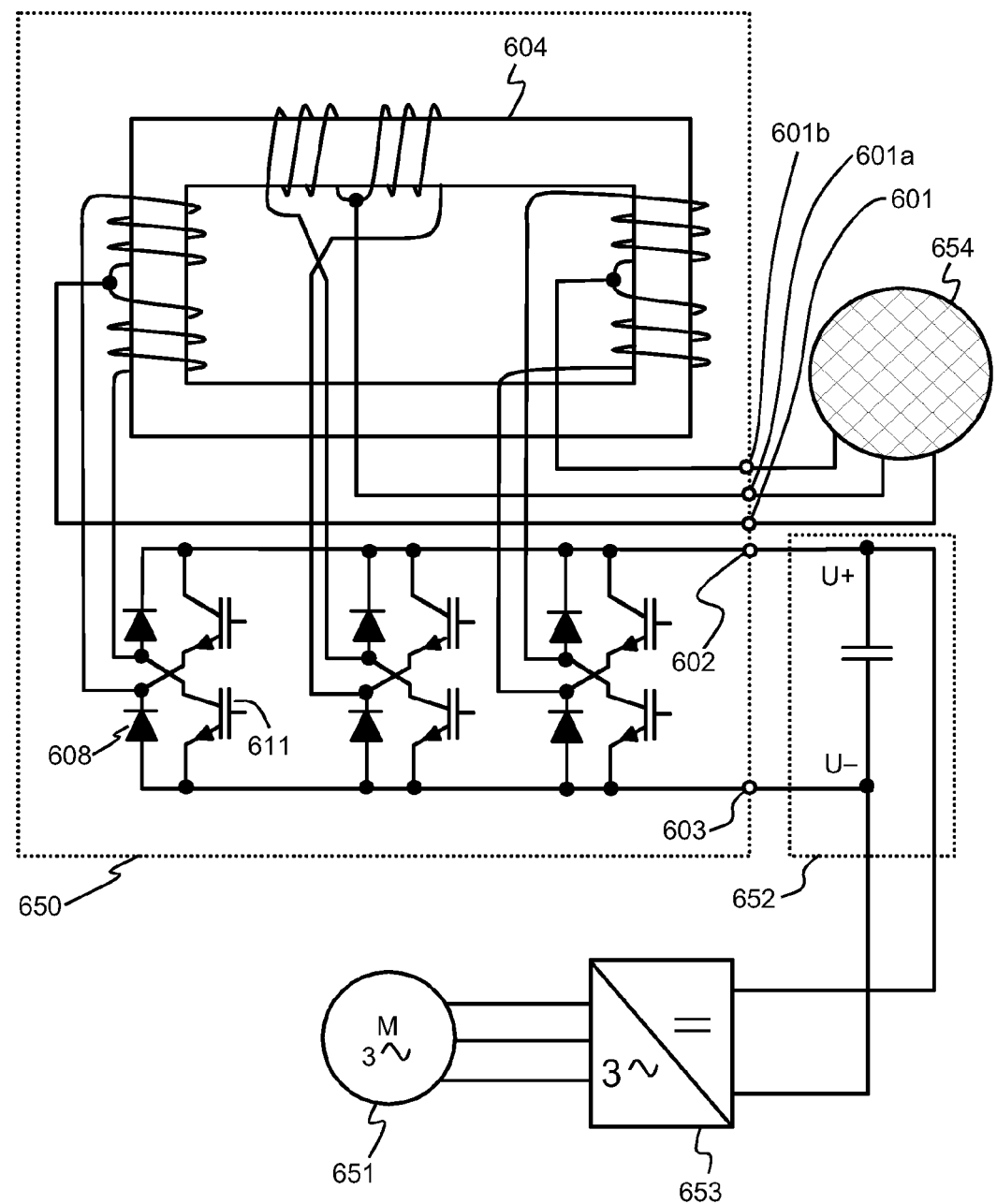
FIG. 6 shows a circuit diagram of an electrical converter device according to an embodiment of the invention.

FIG. 6 shows a circuit diagram of an electrical converter device according to an embodiment of the invention. The electrical converter device comprises a reactor arrangement 650. Alternating voltage terminals 601, 601a, and 601b of the reactor arrangement constitute terminals for connecting the electrical converter device to an alternating voltage network 654. The reactor arrangement 650 has a rectangular magnetic core element 604. The magnetic core element 604 could as well be, for example, a toroid or a triangle. An intermediate circuit 652 of the electrical converter device is coupled between a first direct voltage terminal 602 and a second direct voltage terminal 603 of the reactor arrangement. The reactor arrangement 650 constitutes a main circuit of a converter unit that is able to transfer energy from the alternating voltage network 654 to the intermediate circuit 652 and, preferably but not necessarily, also to transfer energy from the intermediate circuit back to the alternating voltage network. The electrical converter device comprises a converter unit 653 that is able to transfer energy from the intermediate circuit 652 to a load 651 and, preferably but not necessarily, also to transfer energy from the load to the intermediate circuit. Also the converter unit 653 may comprise a reactor arrangement according to an embodiment of the invention.

The electrical converter devices shown in FIGS. 5 and 6 are frequency converters. An electrical converter device according to an embodiment of the invention can be as well, for example, a mere inverter or a mere rectifier. In the reactor arrangements 550 and 650 shown in FIGS. 5 and 6, unidirectional electrical components, e.g. 508 and 608, are diodes and controllable electrical switches, e.g. 511 and 611, are insulated gate bipolar transistors (IGBT). The unidirectional electrical components can be as well thyristors, gate turn-off thyristors (GTO), field effect transistors (FET), bipolar transistors, and/or insulated gate bipolar transistors (IGBT). The controllable electrical switches can be as well thyristors (together with auxiliary circuitries for commutation), gate turn-off thyristors (GTO), field effect transistors (FET), and/or bipolar transistors.

Figure 7:
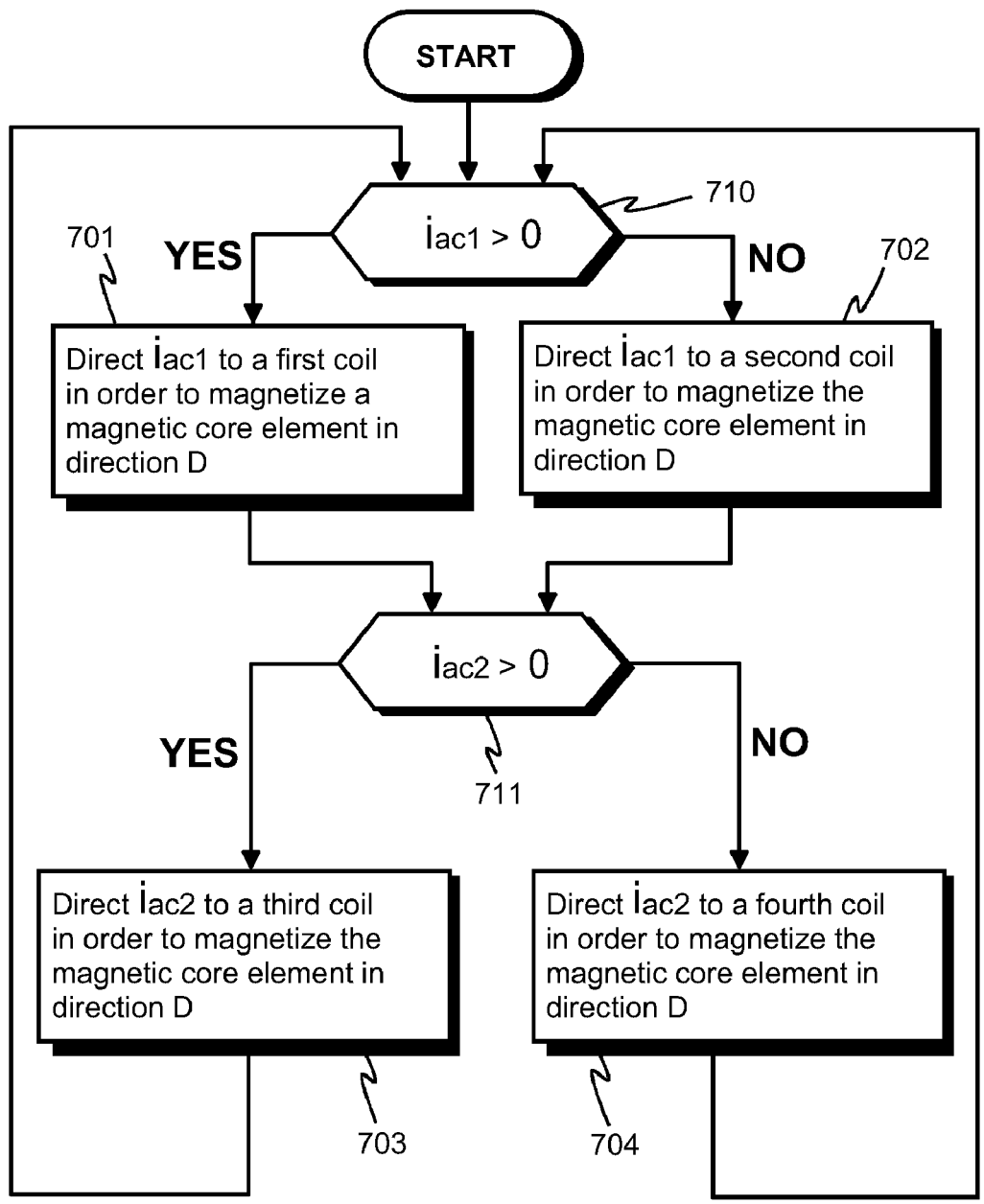
FIG. 7 is a flow chart of a method according to an embodiment of the invention for providing inductive reactance for alternating electrical current.

FIG. 7 is a flow chart of a method according to an embodiment of the invention for providing common-mode inductance for first and second alternating electrical currents $i_{ac1}$ and $i_{ac2}$. A phase 701 comprises directing the alternating electrical current $i_{ac1}$ to a first coil (e.g. 105 in FIG. 1a) if the alternating electrical current $i_{ac1}$ is positive (a YES-branch of a selection phase 710) in order to magnetize a magnetic core element made of magnetically amplifying material in a pre-determined direction D. A phase 702 comprises directing the alternating electrical current $i_{ac1}$ to a second coil (e.g. 107 in FIG. 1a) if the alternating electrical current $i_{ac1}$ is negative (a NO-branch of the selection phase 710) in order to magnetize the magnetic core element in the pre-determined direction D. A phase 703 comprises directing the alternating electrical current $i_{ac2}$ to a third coil (e.g. 105a in FIG. 1a) if the alternating electrical current $i_{ac2}$ is positive (a YES-branch of a selection phase 711) in order to magnetize the magnetic core element in the pre-determined direction D. A phase 704 comprises directing the alternating electrical current $i_{ac2}$ to a fourth coil (e.g. 107a in FIG. 1a) if the alternating electrical current $i_{ac2}$ is negative (a NO-branch of the selection phase 711) in order to magnetize the magnetic core element in the pre-determined direction D. The first coil, the second coil, the third coil, and the fourth coil have mutual magnetic couplings.

In a method according to an embodiment of the invention, a first unidirectional electrical component (e.g. 106 in FIG. 1a) and a second unidirectional electrical component (e.g. 108 in FIG. 1a) are used for directing the alternating current $i_{ac1}$ to the first coil if the alternating electrical current $i_{ac1}$ is positive, and to the second coil, if the alternating electrical current $i_{ac1}$ is negative. The first unidirectional component is located on an electrical current path from a first alternating voltage terminal (e.g. 101 in FIG. 1a) to a first direct voltage terminal (e.g. 102 in FIG. 1a) and the second unidirectional electrical component is located on an electrical current path from a second direct voltage terminal (e.g. 103 in FIG. 1a) to the first alternating voltage terminal. A third unidirectional electrical component (e.g. 106a in FIG. 1a) and a fourth unidirectional electrical component (e.g. 108a in FIG. 1a) are used for directing the alternating current $i_{ac2}$ to the third coil if the alternating electrical current $i_{ac2}$ is positive, and to the fourth coil, if the alternating electrical current $i_{ac2}$ is negative. The third unidirectional component is located on an electrical current path from a second alternating voltage terminal (e.g. 101a in FIG. 1a) to the first direct voltage terminal and the fourth unidirectional electrical component is located on an electrical current path from the second direct voltage terminal to the second alternating voltage terminal.

In a method according to an embodiment of the invention, the first unidirectional electrical component, the second unidirectional electrical component, the third unidirectional electrical component, and the fourth unidirectional electrical component are, respectively, one of the following: a diode, a thyristor, a gate turn-off thyristor (GTO), a field effect transistor (FET), a bipolar transistor, and an insulated gate bipolar transistor (IGBT).

In a method according to an embodiment of the invention, a first controllable electrical switch (e.g. 310 in FIG. 3) is used for forming an unidirectional electrical current path from the first direct voltage terminal (e.g. 302 in FIG. 3) to an electrical node (e.g. 313 in FIG. 3) between the second unidirectional electrical component (e.g. 308 in FIG. 3) and the second coil (e.g. 307 in FIG. 3), and a second controllable electrical switch (e.g. 311 in FIG. 3) is used for forming an unidirectional electrical current path from an electrical node (e.g. 314 in FIG. 3) between the first coil (e.g. 305 in FIG. 3) and the first unidirectional electrical component (e.g. 306 in FIG. 3) to the second direct voltage terminal (e.g. 303 in FIG. 3), and a third controllable electrical switch (e.g. 310a in FIG. 3) is used for forming an unidirectional electrical current path from the first direct voltage terminal (e.g. 302 in FIG. 3) to an electrical node (e.g. 313a in FIG. 3) between the fourth unidirectional electrical component (e.g. 308a in FIG. 3) and the fourth coil (e.g. 307a in FIG. 3), and a fourth controllable electrical switch (e.g. 311a in FIG. 3) is used for forming an unidirectional electrical current path from an electrical node (e.g. 314a in FIG. 3) between the third coil (e.g. 305a in FIG. 3) and the third unidirectional electrical component (e.g. 306a in FIG. 3) to the second direct voltage terminal (e.g. 303 in FIG. 3).

In a method according to an embodiment of the invention, the first controllable electrical switch, the second controllable electrical switch, the third controllable electrical switch, and the fourth controllable electrical switch are, respectively, one of the following: a thyristor, a gate turn-off thyristor (GTO), a field effect transistor (FET), a bipolar transistor, and an insulated gate bipolar transistor (IGBT).

In a method according to an embodiment of the invention, there is at least one other alternating electrical current in addition to the alternating electrical currents $i_{ac1}$ and $i_{ac2}$. Each of the at least one other alternating electrical current is directed to one of two coils allocated for that alternating electrical current depending on the flowing direction (positive or negative) of that alternating electrical current in order to magnetize the magnetic core element in the pre-determined direction D. The coils arranged to magnetize the magnetic core element have mutual magnetic couplings.

While there have been shown and described and pointed out fundamental novel features of the invention as applied to embodiments thereof, it will be understood that that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above.

What is claimed is:

1. A reactor arrangement comprising:
a first alternating voltage terminal for receiving first alternating electrical current;
a second alternating voltage terminal for receiving second alternating electrical current;
a first direct voltage terminal;
a second direct voltage terminal;
a magnetic core element made of magnetically amplifying material;
a first unidirectional electrical component on a first electrical current path from the first alternating voltage terminal to the first direct voltage terminal;
a second unidirectional electrical component on a second electrical current path from the second direct voltage terminal to the first alternating voltage terminal;
a third unidirectional electrical component on a third electrical current path from the second alternating voltage terminal to the first direct voltage terminal;
a fourth unidirectional electrical component on a fourth electrical current path from the second direct voltage terminal to the second alternating voltage terminal;
a first coil on the first electrical current path;
a second coil on the second electrical current path;
a third coil on the third electrical current path; and
a fourth coil on the fourth electrical current path,
wherein
the first unidirectional electrical component and the second unidirectional electrical component are arranged to direct the first alternating electrical current to the first coil as a response to a situation in which the first alternating electrical current is positive, and to the second coil, as a response to a situation in which the first alternating electrical current is negative;
the third unidirectional electrical component and the fourth unidirectional electrical component are arranged to direct the second alternating electrical current to the third coil as a response to a situation in which the second alternating electrical current is positive, and to the fourth coil, as a response to a situation in which the second alternating electrical current is negative; and
the first coil, the second coil, the third coil, and the fourth coil are arranged to magnetize the magnetic core element in a same direction and to have mutual magnetic couplings.

2. The reactor arrangement according to claim 1, wherein the reactor arrangement further comprises at least one other alternating voltage terminal in addition to the first and second alternating voltage terminals, each of the at least one other alternating voltage terminal being coupled to the first direct voltage terminal and to the second direct voltage terminal via unidirectional electrical components and coils in the same manner as the first alternating voltage terminal is coupled to the first direct voltage terminal and to the second direct voltage terminal via the first unidirectional electrical component, the second unidirectional electronic component, the first coil, and the second coil.

3. The reactor arrangement according to claim 1, wherein the magnetic core element has a toroidal shape.

4. The reactor arrangement according to claim 1, wherein the first unidirectional electrical component is located between the first coil and the first direct voltage terminal on the first electrical current path;
the second unidirectional electrical component is located between the second direct voltage terminal and the second coil on the second electrical current path;
the third unidirectional electrical component is located between the third coil and the first direct voltage terminal on the third electrical current path; and
the fourth unidirectional electrical component is located between the second direct voltage terminal and the fourth coil on the fourth electrical current path;
the reactor arrangement further comprising:
a first controllable electrical switch arranged to form an unidirectional electrical current path from the first direct voltage terminal to an electrical node between the second unidirectional electrical component and the second coil;
a second controllable electrical switch arranged to form an unidirectional electrical current path from an electrical node between the first coil and the first unidirectional electrical component to the second direct voltage terminal;
a third controllable electrical switch arranged to form an unidirectional electrical current path from the first direct voltage terminal to an electrical node between the fourth unidirectional electrical component and the fourth coil; and
a fourth controllable electrical switch arranged to form an unidirectional electrical current path from an electrical node between the third coil and the third unidirectional electrical component to the second direct voltage terminal.

5. The reactor arrangement according to claim 4, wherein the reactor arrangement further comprises at least one other alternating voltage terminal in addition to the first and second alternating voltage terminals, each of the at least one other alternating voltage terminal being coupled to the first direct voltage terminal and to the second direct voltage terminal via unidirectional electrical components, via coils, and via controllable electrical switches in the same manner as the first alternating voltage terminal is coupled to the first direct voltage terminal and to the second direct voltage terminal via the first unidirectional electrical component, the second unidirectional electronic component, the first coil, the second coil, the first controllable electrical switch, and the second controllable electrical switch.

6. The reactor arrangement according to claim 1, wherein the first unidirectional electrical component, the second unidirectional electrical component, the third unidirectional electrical component, and the fourth unidirectional electrical component are, respectively, one of the following: a diode, a thyristor, a gate turn-off thyristor (GTO), a field effect transistor (FET), a bipolar transistor, and an insulated gate bipolar transistor (IGBT).

7. The reactor arrangement according to claim 4, wherein the first controllable electrical switch, the second controllable electrical switch, the third controllable electrical switch, and the fourth controllable electrical switch are, respectively, one of the following: a thyristor, a gate turn-off thyristor (GTO), a field effect transistor (FET), a bipolar transistor, and an insulated gate bipolar transistor (IGBT).

8. An electrical converter device comprising a reactor arrangement comprising:

a first alternating voltage terminal for receiving first alternating electrical current;

a second alternating voltage terminal for receiving second alternating electrical current;

a first direct voltage terminal;

a second direct voltage terminal;

a magnetic core element made of magnetically amplifying material;

a first unidirectional electrical component on a first electrical current path from the first alternating voltage terminal to the first direct voltage terminal;

a second unidirectional electrical component on a second electrical current path from the second direct voltage terminal to the first alternating voltage terminal;

a third unidirectional electrical component on a third electrical current path from the second alternating voltage terminal to the first direct voltage terminal;

a fourth unidirectional electrical component on a fourth electrical current path from the second direct voltage terminal to the second alternating voltage terminal;

a first coil on the first electrical current path;

a second coil on the second electrical current path;

a third coil on the third electrical current path; and a fourth coil on the fourth electrical current path;

wherein the first unidirectional electrical component and the second unidirectional electrical component are arranged to direct the first alternating electrical current to the first coil as a response to a situation in which the first alternating electrical current is positive, and to the second coil, as a response to a situation in which the first alternating electrical current is negative;

the third unidirectional electrical component and the fourth unidirectional electrical component are arranged to direct the second alternating electrical current to the third coil as a response to a situation in which the first alternating electrical current is positive, and to the fourth coil, as a response to a situation in which the first alternating electrical current is negative; and the first coil, the second coil, the third coil, and the fourth coil are arranged to magnetize the magnetic core element in a same direction and to have mutual magnetic couplings.

9. The electrical converter device according to claim 8, wherein the alternating voltage terminals of the reactor arrangement constitute terminals for connecting the electrical converter device to an alternating voltage network, and an intermediate circuit of the electrical converter device is coupled to the first direct voltage terminal and to the second direct voltage terminal of the reactor arrangement.

10. The electrical converter device according to claim 8, wherein the alternating voltage terminals of the reactor arrangement constitute terminals for connecting the electrical converter device to a load, and an intermediate circuit of the electrical converter device is coupled to the first direct voltage terminal and to the second direct voltage terminal of the reactor arrangement.

11. A method for providing common-mode inductance for alternating electrical currents, the method comprising:

directing a first alternating electrical current to a first coil if the first alternating electrical current is positive in order to magnetize a magnetic core element made of magnetically amplifying material in a pre-determined direction;

directing the first alternating electrical current to a second coil if the first alternating electrical current is negative in order to magnetize the magnetic core element in the pre-determined direction;

directing a second alternating electrical current to a third coil if the second alternating electrical current is positive in order to magnetize the magnetic core element in the pre-determined direction; and directing the second alternating electrical current to a fourth coil if the second alternating electrical current is negative in order to magnetize the magnetic core element in the pre-determined direction;

wherein the first coil, the second coil, the third coil, and the fourth coil have mutual magnetic couplings.

* * * * *